US008747986B2

(12) United States Patent
Hsu et al.

(10) Patent No.: US 8,747,986 B2
(45) Date of Patent: Jun. 10, 2014

(54) GAS-BARRIER HEAT-SEAL COMPOSITE FILMS AND VACUUM INSULATION PANELS COMPRISING THE SAME

(75) Inventors: Jui-hung Hsu, Changhua (TW); Dan-Cheng Kong, Hsinchu (TW); Chang-Ming Wong, Chupei (TW)

(73) Assignee: Industrial Technology Research Institute, Hsinchu County (TW)

( * ) Notice: Subject to any disclaimer, the term of this patent is extended or adjusted under 35 U.S.C. 154(b) by 562 days.

(21) Appl. No.: 13/050,817

(22) Filed: Mar. 17, 2011

(65) Prior Publication Data

US 2012/0148785 A1 Jun. 14, 2012

(30) Foreign Application Priority Data

Dec. 9, 2010 (TW) .............................. 99142987 A

(51) Int. Cl.
*B32B 27/06* (2006.01)
*B32B 7/12* (2006.01)
*B32B 27/08* (2006.01)

(52) U.S. Cl.
USPC ............................................ 428/98; 428/323

(58) Field of Classification Search
USPC .................................................. 428/98, 323
See application file for complete search history.

(56) References Cited

U.S. PATENT DOCUMENTS 6,004,660 A 12/1999 Topolski et al.
6,503,617 B2 1/2003 Jacobsen et al.
6,740,394 B2 5/2004 Jacobsen et al.
6,838,146 B2 1/2005 Merrill et al.
7,125,596 B2 10/2006 Eyhorn et al.
2002/0090522 A1 7/2002 Jacobsen et al.
2010/0015431 A1* 1/2010 Matsui et al. ................ 428/323

FOREIGN PATENT DOCUMENTS

CN 101863336 A 10/2010
JP 54-43991 A 4/1979
WO 9849006 A1 11/1998

OTHER PUBLICATIONS

Notice of Allowance issued by the Taiwan Intellectual Property Office on Jul. 4, 2013, for the above-referenced application's counterpart application in Taiwan (Application No. 099142987).
Notification of Office Action (First Examination Opinion) issued by China's State Intellectual Property Office on Dec. 11, 2013, for the above-referenced application's counterpart application in China (Application No. 201010610021.7).

* cited by examiner

*Primary Examiner* — Brent O'Hern
(74) *Attorney, Agent, or Firm* — Pai Patent & Trademark Law Firm; Chao-Chang David Pai

(57) ABSTRACT

A gas-barrier heat-seal composite film is provided. The gas-barrier heat-seal composite film includes a heat-seal layer including very low density polyethylene (VLDPE), low density polyethylene (LDPE), linear low density polyethylene (LLDPE), high density polyethylene (HDPE), metallocene polyethylene (mPE), metallocene linear low density polyethylene (mLLDPE), ethylene vinyl acetate (EVA) copolymer, ethylene-propylene (EP) copolymer or ethylene-propylene-butene (EPB) terpolymer, and a gas-barrier layer formed on the heat-seal layer, wherein the gas-barrier layer includes a plurality of composite layers, each including a polymer substrate and a single layer or multiple layers of metal or oxide thereof which is formed on one side or both sides of the polymer substrate, and the polymer substrate includes uniaxial-stretched or biaxial-stretched polyethylene terephthalate (PET), polybutylene terephthalate (PBT), polyimide (PI), ethylene/vinyl alcohol (EVOH) copolymer or a combination thereof. The invention also provides a vacuum insulation panel including the composite film.

10 Claims, 4 Drawing Sheets

GAS-BARRIER HEAT-SEAL COMPOSITE FILMS AND VACUUM INSULATION PANELS COMPRISING THE SAME

CROSS REFERENCE TO RELATED APPLICATIONS

This Application claims priority of Taiwan Patent Application No. 99142987, filed on Dec. 9, 2010, the entirety of which is incorporated by reference herein.

BACKGROUND OF THE INVENTION

1. Field of the Invention

The invention relates to a gas-barrier heat-seal material, and in particular to a gas-barrier heat-seal composite film and a vacuum insulation panel comprising the composite film.

2. Description of the Related Art

A high-gas-barrier film material possesses a high gas barrier and flexibility. When the high-gas-barrier film material is utilized in a vacuum seal or a gas-barrier package, the effect of not allowing gas to notably pass thereto can last for several years. Among the commonly used gas-barrier film materials, plastic film materials do not come close to meet gas barrier requirements. Although glass materials have a high gas barrier, it cannot be applied easily due to its shortcomings of having an energy-consuming process, having no flexibility and having a heavy weight etc. Metal film materials such as aluminum foil have the shortcomings of having an energy-consuming process and non-recyclability, and its high thermal conductivity makes it inappropriate for application in certain specific products (for example vacuum insulation panels). Since a single material cannot meet the ideal characteristics, composite film materials (for example plastic film materials with metal or silicon oxide ($SiO_x$) evaporated thereon) have been developed and can meet flexibility and high gas barrier requirements simultaneously; in spite, the gas barrier of the composite film materials can be greatly improved.

BRIEF SUMMARY OF THE INVENTION

One embodiment of the invention provides a gas-barrier heat-seal composite film comprising a heat-seal layer comprising very low density polyethylene (VLDPE), low density polyethylene (LDPE), linear low density polyethylene (LLDPE), high density polyethylene (HDPE), metallocene polyethylene (mPE), metallocene linear low density polyethylene (mLLDPE), ethylene vinyl acetate (EVA) copolymer, ethylene-propylene (EP) copolymer or ethylene-propylene-butene (EPB) terpolymer, and a gas-barrier layer comprising a plurality of composite layers formed on the heat-seal layer, each comprising a single layer or multiple layers of metal or oxide formed on one side or both sides of a polymer substrate, wherein the polymer substrate comprises uniaxial-stretched or biaxial-stretched polyethylene terephthalate (PET), polybutylene terephthalate (PBT), polyimide (PI), ethylene/vinyl alcohol (EVOH) copolymer or a combination thereof.

The gas-barrier heat-seal composite film further comprises at least one primer layer formed between the polymer substrate and the layer of metal or oxide thereof or between the layers of metal or oxide thereof. The primer layer comprises urethane acrylate, epoxy acrylate, silicone acrylate or a mixture thereof. The gas-barrier heat-seal composite film further comprises a protective layer formed on the gas-barrier layer. The protective layer comprises uniaxial-stretched or biaxial-stretched polyethylene terephthalate (PET), polyamide (PA), poly(ethylene-2,6-naphthalate) (PEN) or polyimide (PI).

The disclosed gas-barrier heat-seal composite film structure comprises three parts, a protective layer, a high-gas-barrier composite layer and a heat-seal layer in order. In the structure, the protective layer provides printability and protects the underlying high-gas-barrier composite layer from physical damage. The high-gas-barrier composite layer provides a high gas barrier. The heat-seal layer provides heat-sealability. The primer layer conducted into the high-gas-barrier composite layer improves metal adhesion and gas barrier effects.

The invention provides a gas-barrier heat-seal composite film with flexibility, a high gas barrier, a light weight, energy savings and recyclability which can replace the conventional flexible aluminum foil high-gas-barrier films, and is appropriate for application in high-gas-barrier food products and medicine packaging materials and a vacuum insulation panel of a freezer, a refrigerator, an icehouse and a building, as a carbon reduction material, with an oxygen transmission rate smaller than 0.01 cc/m$^2$day·atm, a water vapor transmission rate smaller than 0.01 g/m$^2$day and a heat-seal strength greater than 1,500 g/25 mm. Additionally, the process for the gas-barrier heat-seal composite film saves energy and is simple, and is appropriate for application in roll to roll production. The composite film also possesses weatherability under a low temperature due to the glass transition temperature, Tg, of the heat seal layer is lower than 0° C.

One embodiment of the invention provides a vacuum insulation panel (VIP) comprising a foam material with a density smaller than 0.1 g/cm$^3$, an open-cell ratio greater than 90%, a bubble size smaller than 250 μm and pressure resistance greater than 1 kg/cm$^2$, and the disclosed gas-barrier heat-seal composite film, covering the foam material, with an oxygen transmission rate lower than 0.01 cc/m$^2$day·atm and a water vapor transmission rate lower than 0.01 cc/m$^2$day.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein:

FIG. 1 shows a gas-barrier heat-seal composite film according to an embodiment of the invention;

FIG. 2 shows a gas-barrier heat-seal composite film according to an embodiment of the invention;

FIG. 3 shows a gas-barrier heat-seal composite film according to an embodiment of the invention.

DETAILED DESCRIPTION OF THE INVENTION

Figure 4:
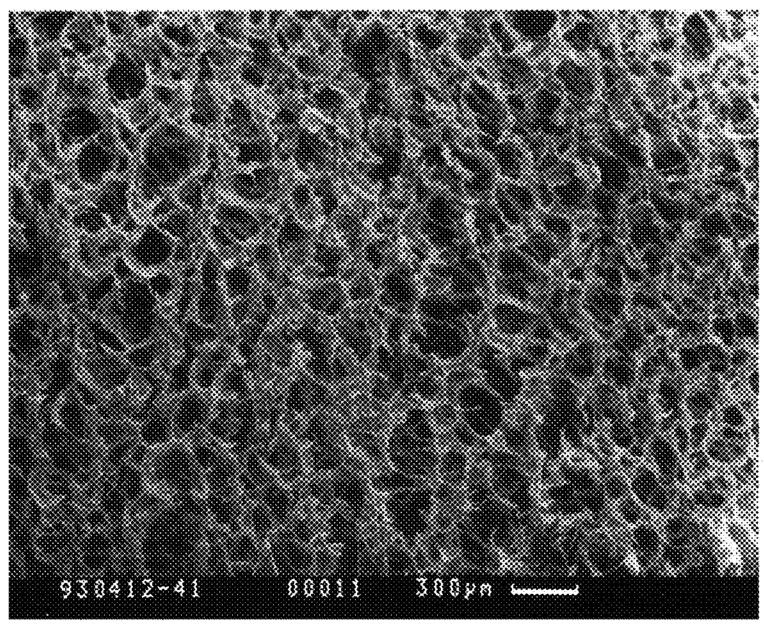
FIG. 4 shows an inner structure of an open-cell polystyrene foam material according to an embodiment of the invention.

One embodiment of the invention provides a gas-barrier heat-seal composite film comprising a heat-seal layer comprising very low density polyethylene (VLDPE), low density polyethylene (LDPE), linear low density polyethylene (LLDPE), high density polyethylene (HDPE), metallocene polyethylene (mPE), metallocene linear low density polyethylene (mLLDPE), ethylene vinyl acetate (EVA) copolymer, ethylene-propylene (EP) copolymer or ethylene-propylene-butene (EPB) terpolymer, and a gas-barrier layer comprising a plurality of composite layers (at least two composite layers) formed on the heat-seal layer, each comprising a single layer or multiple layers of metal or oxide thereof formed on one side or both sides of a polymer substrate, wherein the polymer substrate comprises uniaxial-stretched or biaxial-stretched polyethylene terephthalate (PET), polybutylene terephthalate (PBT), polyimide (PI), ethylene/vinyl alcohol (EVOH) copolymer or a combination thereof, for example polyethylene terephthalate (PET) with an ethylene/vinyl alcohol (EVOH) copolymer skin.

The layer of metal or oxide thereof may comprise metal elements in the third period or the fourth period or oxides thereof, for example aluminum, chromium, copper, titanium, zinc, aluminum oxide, calcium oxide, titanium oxide or zinc oxide. In an embodiment, the single or multiple layers of metal or oxide thereof are formed on one side or both sides of the polymer substrate by, for example vacuum evaporation.

The gas-barrier heat-seal composite film further comprises at least one primer layer formed between the polymer substrate and the layer of metal or oxide thereof or between two layers of metal or oxide thereof to improve metal adhesion and gas barrier effect. The primer layer may comprise urethane acrylate, epoxy acrylate, silicone acrylate or a mixture thereof.

The gas-barrier heat-seal composite film further comprises a protective layer formed on the gas-barrier layer. The protective layer may comprise uniaxial-stretched or biaxial-stretched polyethylene terephthalate (PET), polyamide (PA), poly(ethylene-2,6-naphthalate) (PEN) or polyimide (PI).

The gas-barrier heat-seal composite film further comprises a glue formed between the heat-seal layer, the gas-barrier layer and the protective layer and between the two composite layers of the gas-barrier layer to bind the heat-seal layer, the gas-barrier layer and the protective layer and the two composite layers of the gas-barrier layer. The glue may comprise epoxy resin, polyurethane resin, acrylic resin, cellulose resin or low density polyethylene (LDPE).

The heat-seal layer has a thickness from 12 μm to 100 μm, preferably from 20 μm to 60 μm. The polymer substrate for vacuum evaporation has a thickness of about 10-50 μm, preferably 12-25 μm. The layer of metal or oxide thereof has a thickness of 30-100 nm, preferably 40-80 nm. The protective layer has a thickness of about 12-50 μm, preferably 12-25 μm.

The disclosed gas-barrier heat-seal composite film structure comprises three parts, a protective layer, a high-gas-barrier composite layer and a heat-seal layer in order. In the structure, the protective layer provides printability and protects the underlying high-gas-barrier composite layer from physical damage. The high-gas-barrier composite layer provides a high gas-barrier. The heat-seal layer provides heat-sealability. The primer layer conducted into the high-gas-barrier composite layer improves metal adhesion and gas barrier effects.

The invention provides a gas-barrier heat-seal composite film with flexibility, a high gas barrier, a light weight, energy savings and recyclability which can replace the conventional flexible aluminum foil high-gas-barrier films, and is appropriate for application in high-gas-barrier food products and medicine packaging materials and a vacuum insulation panel of a freezer, a refrigerator, an icehouse and a building, as a carbon reduction material, with an oxygen transmission rate smaller than 0.01 cc/m$^2$day·atm, a vapor transmission rate smaller than 0.01 g/m$^2$day and a heat-seal strength greater than 1,500 g/25 mm. Additionally, the process for the gas-barrier heat-seal composite film saves energy and is simple, and is appropriate for application in roll to roll production. The composite film also possesses weatherability under a low temperature due to the glass transition temperature, Tg, of the heat seal layer is lower than 0° C.

One embodiment of the invention provides a vacuum insulation panel (VIP) comprising a foam material with a density smaller than 0.1 g/cm$^3$, the content of open-cells greater than 90%, a bubble size smaller than 250 μm, preferably smaller than 100 μm, and pressure resistance greater than 1 kg/cm$^2$, and the disclosed gas-barrier heat-seal composite film, covering the foam material, with an oxygen transmission rate lower than 0.01 cc/m$^2$day·atm and a vapor transmission rate lower than 0.01 cc/m$^2$day.

The foam material may comprise open-cell polystyrene (PS) or polypropylene (PP).

The vacuum insulation panel has a coefficient of thermal conductivity lower than 0.01 W/m·k.

Example 1

Preparation of the Gas-Barrier Heat-Seal Composite Film (1)

Figure 1:
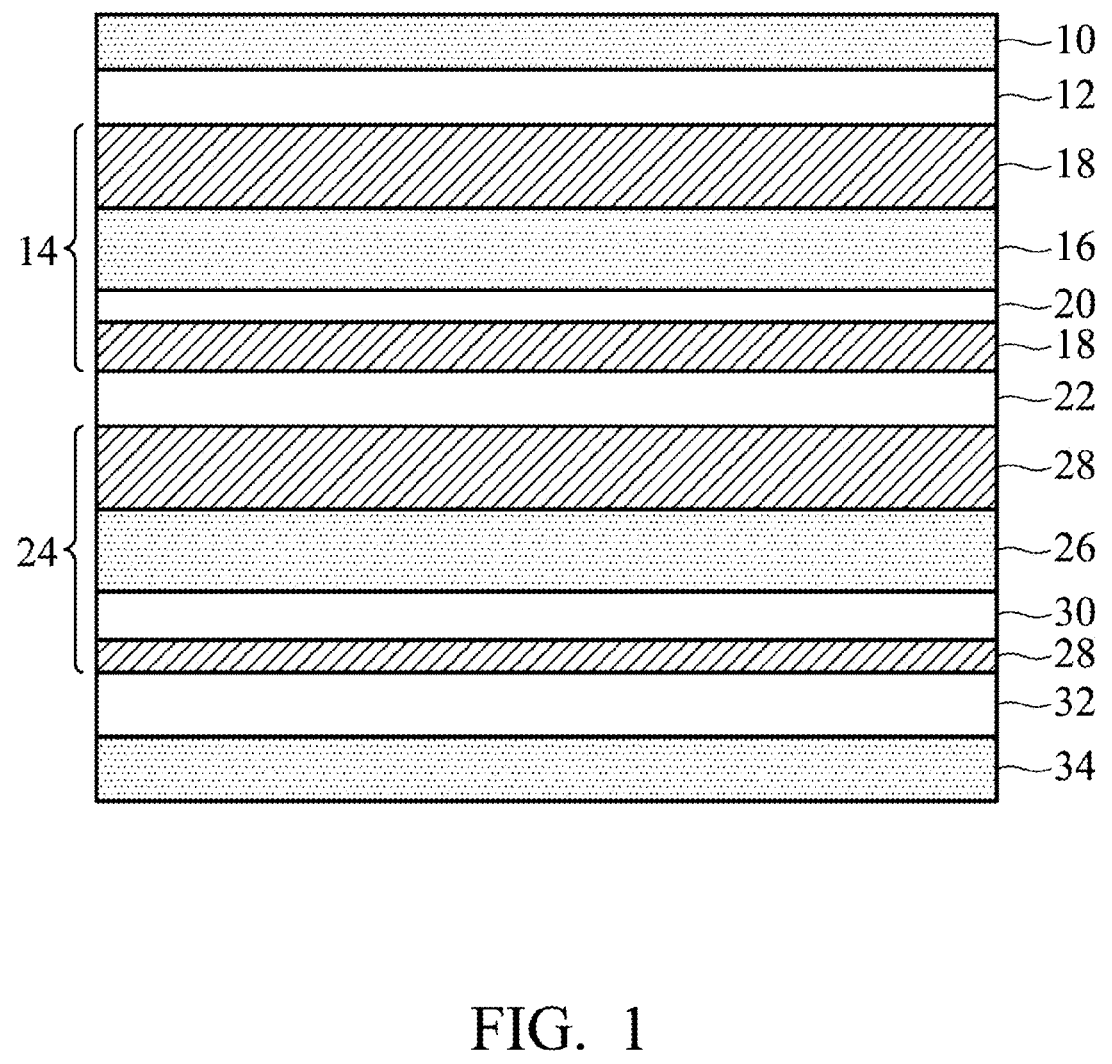

A multiple-layered composite film was prepared by the evaporation and binding method, as shown in FIG. 1. The composite film comprised, from top to bottom, a PET protective layer 10 (with a thickness of 13 μm), an epoxy resin glue 12 (with a thickness of 7 μm), a PET composite layer 14 (a PET substrate 16 with a thickness of 17 μm vacuum-metallized with two aluminum layers 18 with a respective thickness of 30 nm on both sides thereof, and a primer layer 20 with a thickness of 7 μm), an epoxy resin glue 22 (with a thickness of 7 μm), a PET composite layer 24 (a PET substrate 26 with a thickness of 17 μm plated with two aluminum layers 28 with a respective thickness of 30 nm on both sides thereof, and a primer layer 30 with a thickness of 7 μm), an epoxy resin glue 32 (with a thickness of 7 μm) and a PE heat-seal layer 34 (with a thickness of 60 μm). In this example, the oxygen transmission rate of the gas-barrier heat-seal composite film was lower than 0.01 cc/m$^2$day·Atm. The heat-seal strength of the gas-barrier heat-seal composite film was greater than 1,500 g/25 mm.

Example 2

Preparation of the Gas-Barrier Heat-Seal Composite Film (2)

Figure 2:
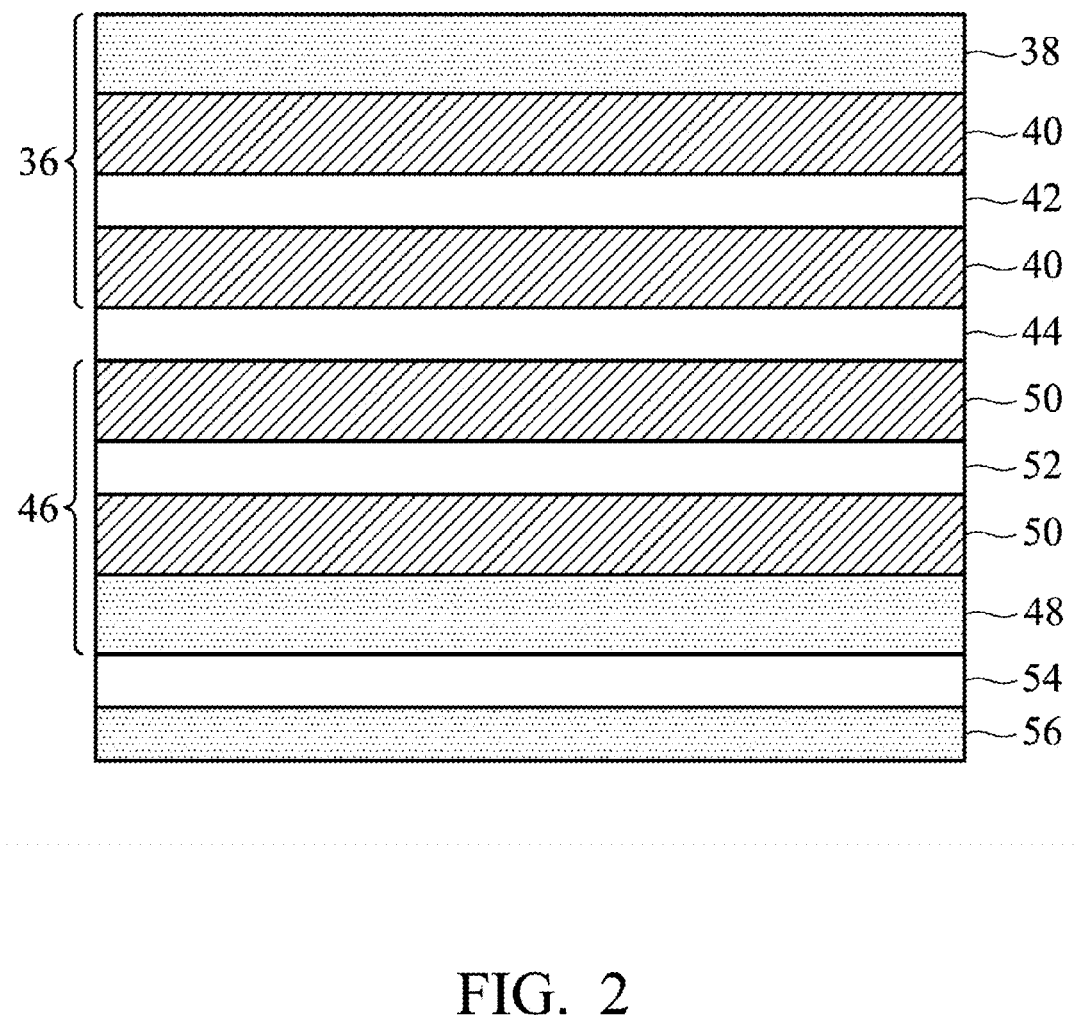

A multiple-layered composite film was prepared by the evaporation and binding method, as shown in FIG. 2. The composite film comprised, from top to bottom, a PET composite layer 36 (a PET substrate 38 with a thickness of 17 μm vacuum-metallized with two aluminum layers 40 with a respective thickness of 30 nm on one side thereof toward an epoxy resin glue 44, and a primer layer 42 with a thickness of 7 μm), the epoxy resin glue 44 (with a thickness of 7 μm), a PET composite layer 46 (a PET substrate 48 with a thickness of 17 μm vacuum-metallized with two aluminum layers 50 with a respective thickness of 30 nm on one side thereof toward an epoxy resin glue 44, and a primer layer 52 with a thickness of 7 μm), an epoxy resin glue 54 (with a thickness of 7 μm) and a EP-copolymer heat-seal layer 56 (with a thickness of 60 μm). In this example, the oxygen transmission rate of the gas-barrier heat-seal composite film was lower than 0.01 cc/m$^2$day·Atm. The water vapor transmission rate of the gas-barrier heat-seal composite film was lower than 0.01 cc/m$^2$day. Additionally, the heat-seal strength of the gas-barrier heat-seal composite film was greater than 1,500 g/25 mm.

Example 3

Preparation of the Gas-Barrier Heat-Seal Composite Film (3)

Figure 3:
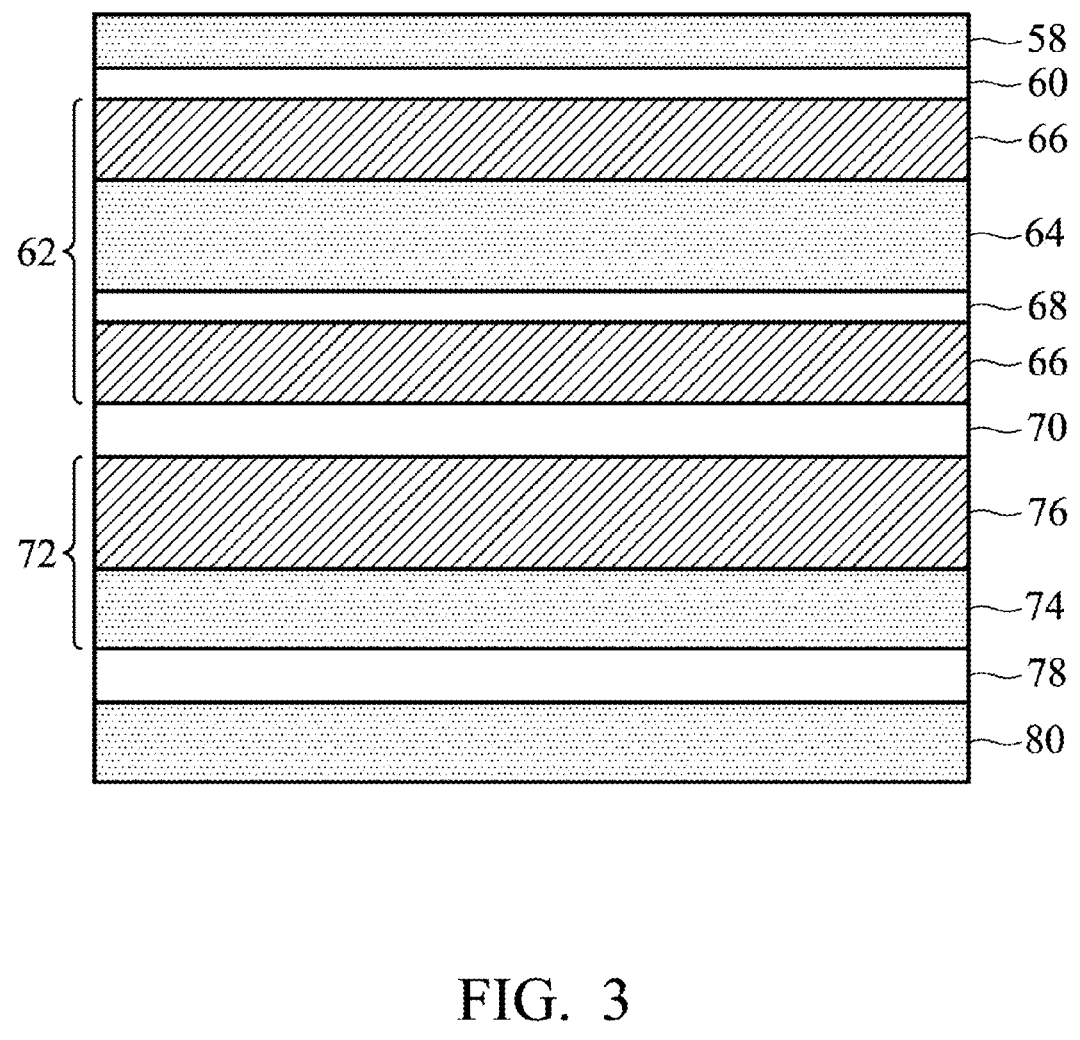

A multiple-layered composite film was prepared by the evaporation and binding method, as shown in FIG. 3. The composite film comprised, from top to bottom, a PET protective layer 58 (with a thickness of 13 μm), an epoxy resin glue 60 (with a thickness of 7 μm), a PET composite layer 62 (a PET substrate 64 with a thickness of 17 μm vacuum-metallized with two aluminum layers 66 with a respective thickness of 30 nm on both sides thereof, and a primer layer 68 with a thickness of 7 μm), an epoxy resin glue 70 (with a thickness of 7 μm), a EVOH composite layer 72 (a EVOH substrate 74 containing 44% ethylene with a thickness of 20 μm metallized with one aluminum layer 76 with a thickness of 30 nm on one side thereof toward the epoxy resin glue 70 bound with the metallized aluminum layer 76), an epoxy resin glue 78 (with a thickness of 7 μm) and a PE heat-seal layer 80 (with a thickness of 60 μm). In this example, the oxygen transmission rate of the gas-barrier heat-seal composite film was less than 0.01 $cc/m^2day \cdot Atm$. The heat-seal strength of the gas-barrier heat-seal composite film was greater than 1,500 g/25 mm.

Example 4

Preparation of the Foam Material of the Vacuum Insulation Panel

In this example, polystyrene (PS) with a molecular weight of 200,000 to 300,000 was utilized. First, PS was uniformly mixed with other resins (for example low density polyethylene (LDPE)), fillers (for example calcium carbonate and carbon black) and nucleating agents (for example calcium stearate and zinc stearate) using an extruder under 150-200° C. to form PS resin particles. A foam material was then prepared by a continuous method. In the continuous method, two tandem-arranged extruders were connected. The second extruder was connected to a mold head. PS resin particles were conducted into the first extruder. In the first extruder, PS resin was melted, a gas, for example, carbon dioxide ($CO_2$), was conducted thereto and then the gas and PS resin were mixed under 180-220° C. The melted PS resin mixed with the gas was then cooled and delivered to the mold head through the second extruder under 120-140° C. When the melted PS resin mixed with the gas passed through the mold head, the foam material was formed. The inner structure of the open-cell PS foam material is shown in FIG. 4. The pressure of the mold head was set to 800 psi-2,000 psi. In this example, the prepared foam material had a density of 0.05-0.09 $g/cm^3$, a bubble size of 80-250 μm, the content of open-cells greater than 95% and pressure resistance greater than 1 $kg/cm^2$.

Example 5

Preparation of the Vacuum Insulation Panel

After the PS resin was processed by the continuous method and foamed by supercritical carbon dioxide ($CO_2$), the open-cell PS foam material was obtained (as prepared by Example 4). The foam material was then packaged by the gas-barrier heat-seal composite film (as prepared by Examples 1-3), vacuum-evacuated and heat-sealed. The vacuum insulation panel was finally prepared. Specifically, after evacuation, the pressure within the vacuum insulation panel must be lower than 0.75 torr (1 mbar). In this example, the prepared vacuum insulation panel had a coefficient of thermal conductivity of 0.006-0.01 W/m·k.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A gas-barrier heat-seal composite film, comprising:

a heat-seal layer comprising very low density polyethylene (VLDPE), low density polyethylene (LDPE), linear low density polyethylene (LLDPE), high density polyethylene (HDPE), metallocene polyethylene (mPE), metallocene linear low density polyethylene (mLLDPE), ethylene-propylene (EP) copolymer or ethylene-propylene-butene (EPB) terpolymer; and a gas-barrier layer comprising a plurality of composite layers formed on one side of the heat-seal layer, each of the composite layers comprising multiple layers of metal or oxide thereof formed on one side or both sides of a polymer substrate, and at least one primer layer formed between the polymer substrate and one of the layers of metal or oxide thereof or between the layers of metal or oxide thereof, wherein the polymer substrate comprises uniaxial-stretched or biaxial-stretched polyethylene terephthalate (PET), polybutylene terephthalate (PBT), polyimide (PI), ethylene/vinyl alcohol (EVOH) copolymer or a combination thereof; and wherein the primer layer comprises urethane acrylate, epoxy acrylate, silicone acrylate or a mixture thereof.

2. The gas-barrier heat-seal composite film as claimed in claim 1, wherein each of the layers of metal or oxide thereof comprises metal elements in the third period or the fourth period or oxides thereof.

3. The gas-barrier heat-seal composite film as claimed in claim 2, wherein each of the layers of metal or oxide thereof comprises aluminum, chromium, copper, titanium, zinc, aluminum oxide, calcium oxide, titanium oxide or zinc oxide.

4. The gas-barrier heat-seal composite film as claimed in claim 1, further comprising a protective layer formed on the gas-barrier layer.

5. The gas-barrier heat-seal composite film as claimed in claim 4, wherein the protective layer comprises uniaxial-stretched or biaxial-stretched polyethylene terephthalate (PET), polyamide (PA), poly(ethylene-2,6-naphthalate) (PEN) or polyimide (PI).

6. The gas-barrier heat-seal composite film as claimed in claim 4, further comprising a glue formed between the heat-seal layer and the gas-barrier layer, between the gas-barrier layer and the protective layer, and between the composite layers of the gas-barrier layer.

7. The gas-barrier heat-seal composite film as claimed in claim 1, wherein the heat-seal layer has a thickness of 12-100 μm.

8. The gas-barrier heat-seal composite film as claimed in claim 1, wherein the polymer substrate of each of the composite layers has a thickness of 12-50 μm.

9. The gas-barrier heat-seal composite film as claimed in claim 1, wherein each of the layers of metal or oxide thereof has a thickness of 30-100 nm.

10. The gas-barrier heat-seal composite film as claimed in claim 1, wherein the protective layer has a thickness of 12-50 μm.

* * * * *